US012134542B2

(12) United States Patent
Koba

(10) Patent No.: US 12,134,542 B2
(45) Date of Patent: Nov. 5, 2024

(54) HALL DESTINATION FLOOR INPUT DEVICE FOR ELEVATORS, ELEVATOR CONTROL SYSTEM, AND ELEVATOR SYSTEM

(71) Applicant: Mitsubishi Electric Corporation, Tokyo (JP)

(72) Inventor: Yoshimasa Koba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1259 days.

(21) Appl. No.: 16/606,242

(22) PCT Filed: Sep. 27, 2017

(86) PCT No.: PCT/JP2017/034933
§ 371 (c)(1),
(2) Date: Oct. 18, 2019

(87) PCT Pub. No.: WO2019/064371
PCT Pub. Date: Apr. 4, 2019

(65) Prior Publication Data
US 2020/0255258 A1 Aug. 13, 2020

(51) Int. Cl.
*B66B 1/14* (2006.01)
*B66B 1/46* (2006.01)
(Continued)

(52) U.S. Cl.
CPC ................ *B66B 1/14* (2013.01); *B66B 5/024* (2013.01); *B66B 1/468* (2013.01); *B66B 3/00* (2013.01);
(Continued)

(58) Field of Classification Search
CPC ........... B66B 1/14; B66B 5/024; B66B 1/468; B66B 3/00; B66B 2201/4615; B66B 2201/463; B66B 2201/4646; B66B 5/021
See application file for complete search history.

(56) References Cited

U.S. PATENT DOCUMENTS 8,505,693 B2 * 8/2013 Koba ...................... B66B 1/468 187/901
2011/0155516 A1 * 6/2011 Mason .................... B66B 5/021 187/384
2019/0084800 A1 * 3/2019 Williams ................ B66B 3/002

FOREIGN PATENT DOCUMENTS

EP 3290373 A1 * 3/2018
JP 50-31546 A 3/1975
(Continued)

OTHER PUBLICATIONS

International Search Report and Written Opinion mailed on Dec. 12, 2017 for PCT/JP2017/034933 filed on Sep. 27, 2017, 11 pages including English Translation of the International Search Report.

*Primary Examiner* — Jeffrey Donels
(74) *Attorney, Agent, or Firm* — XSENSUS LLP

(57) ABSTRACT

A hall destination floor input device for elevators includes an information input receiver provided on a hall of an elevator on a floor set as an evacuation floor in case of an emergency in a building including the elevator. The information input receiver receives information from outside. The device also includes a signal transmitter that transmits a signal to a control system of the elevator, and a controller configured to cause the signal transmitter to transmit a signal indicating a destination floor of the elevator when the information receiver receives input of information on the destination floor if an operation mode is not an emergency mode based on emergency information of the building, and cause the signal transmitter to transmit a signal to open a door of the
(Continued)

elevator on the hall when the information input receiver starts receiving input of information if the operation mode is the emergency mode.

6 Claims, 6 Drawing Sheets

(51) Int. Cl.
*B66B 3/00* (2006.01)
*B66B 5/02* (2006.01)

(52) U.S. Cl.
CPC . *B66B 2201/4615* (2013.01); *B66B 2201/463* (2013.01); *B66B 2201/4646* (2013.01)

(56) References Cited

FOREIGN PATENT DOCUMENTS

| | | | |
|---|---|---|---|
| JP | 61-169470 A | | 7/1986 |
| JP | 4-298464 A | | 10/1992 |
| JP | 6-255911 A | | 9/1994 |
| JP | 2001-287876 A | | 10/2001 |
| JP | 2005-126155 A | | 5/2005 |
| JP | 5981586 B1 | * | 8/2016 |

* cited by examiner

HALL DESTINATION FLOOR INPUT DEVICE FOR ELEVATORS, ELEVATOR CONTROL SYSTEM, AND ELEVATOR SYSTEM

FIELD

The present invention relates to a hall destination floor input device for elevators, an elevator control system, and an elevator system.

BACKGROUND

For example, PTL 1 discloses a hall destination floor input device for elevators. The hall destination floor input device allows a user to check whether or not a floor to which the user is going is registered and a car that the user should take.

CITATION LIST

Patent Literature

[PTL 1] JP 2001-287876 A

SUMMARY

Technical Problem

However, the hall destination floor input device described in PTL 1 does not consider control of the elevator in case of an emergency in a building including the elevator. Thus, PTL 1 does not consider checking whether or not a user is trapped in a car standing by on an evacuation floor with its door closed in case of an emergency, either.

The present invention is achieved to solve the above described problem. An object of the present invention is to provide a hall destination floor input device for elevators, an elevator control system, and an elevator system which allow an easy check of Whether or not a user is trapped in a car standing by on an evacuation floor with its door closed in case of an emergency.

Solution to Problem

A hall destination floor input device for elevators according to the present invention includes: an information input unit provided on a hall of an elevator on a floor set as an evacuation floor in case of an emergency in a building including the elevator, the information input unit being configured to receive input of information from outside; a signal transmission unit configured to transmit a signal to a control system of the elevator; and a control unit configured to cause the signal transmission unit to transmit a signal indicating a destination floor of the elevator when the information input unit receives input of information on the destination floor if an operation ode is not an emergency mode based on emergency information of the building, and cause the signal transmission unit to transmit a signal to open a door of the elevator on the hall when the information input unit starts receiving input of information if the operation mode is the emergency mode.

An elevator control system according to the present invention includes: a control unit configured to open a door of an elevator on a hall of the elevator when a car of the elevator is standing by on the hall with the door closed, in a case where a hall destination floor input device starts receiving input of information to transmit a signal to open the door of the elevator on the hall, if an operation mode of the hall destination floor input device is an emergency mode based on emergency information of a building, the hall destination floor input device being provided on the hall of the elevator on a floor set as an evacuation floor in case of an emergency in the building including the elevator.

An elevator system according to the present invention includes: a hall destination floor input device provided on a hall of an elevator on a floor set as an evacuation floor in case of an emergency in a building including the elevator, the hall destination floor input device being configured to transmit a signal indicating a destination floor of the elevator when receiving input of information on the destination floor if an operation mode is not an emergency mode based on emergency information of the building, and transmit a signal to open a door of the elevator on the hall when starting receiving input of information if the operation mode is the emergency mode; and a control system configured to open the door of the elevator on the hall when a car of the elevator is standing by on the hall with the door closed, in a case where the hall destination floor input device starts receiving input of information to transmit the signal to open the door of the elevator on the hall, if the operation mode of the hall destination floor input device is the emergency mode.

Advantageous Effects of Invention

According to the present invention, when the hall destination floor input device starts receiving the input of information if the operation mode of the hall destination floor input device is the emergency mode, the hall destination floor input device transmits the signal to open the door of the elevator on the hall on the evacuation floor. This allows an easy check of whether or not a user is trapped in a car standing by on the evacuation floor with the door closed in case of an emergency.

DESCRIPTION OF EMBODIMENTS

Figure 1:
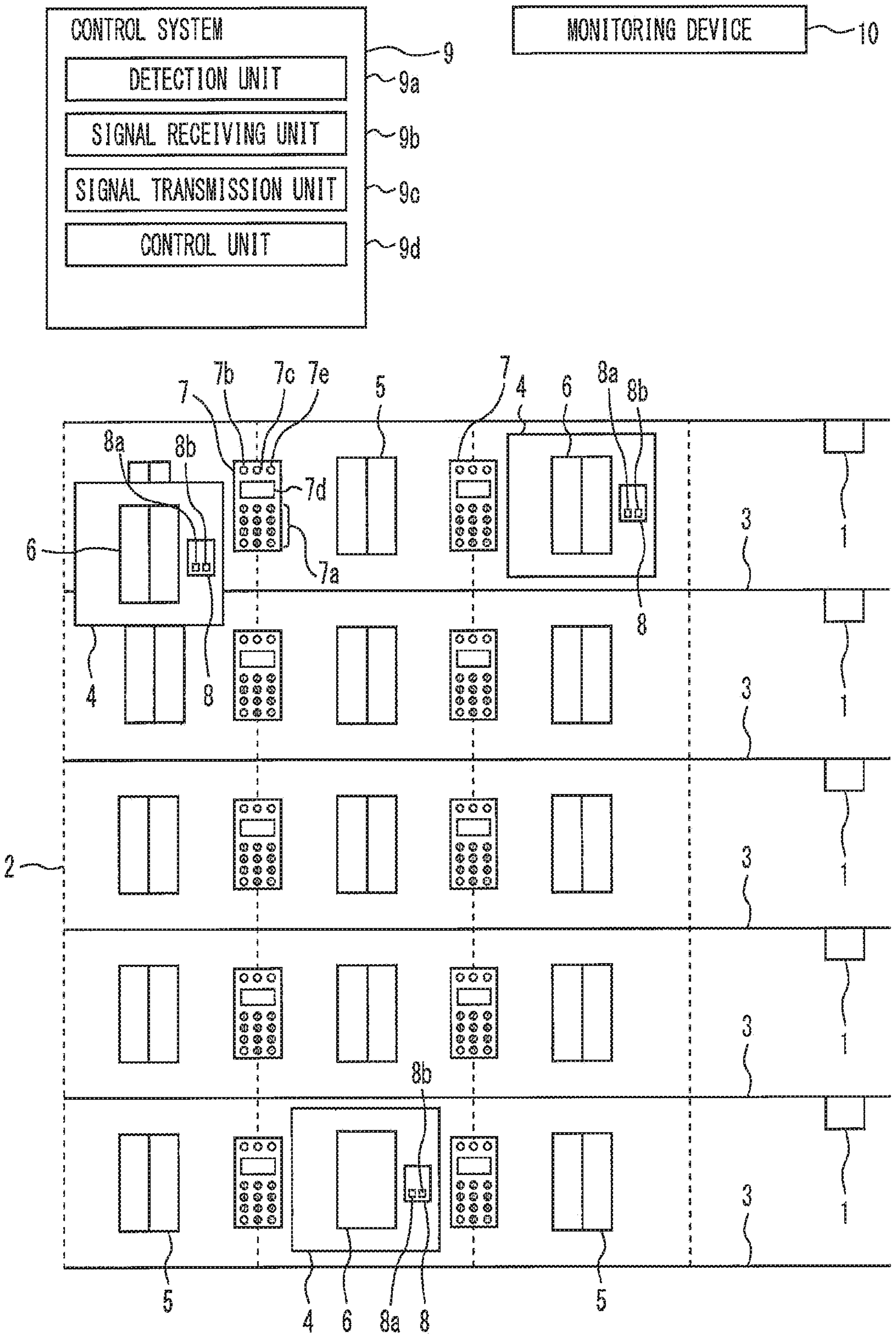
FIG. 1 is a configuration diagram of an elevator system according to Embodiment 1 of the present invention.

With reference to the accompanying drawings, embodiments of the present invention will be described. In the drawings, the same or corresponding components are denoted by the same reference numerals. Overlapping descriptions of the components will be appropriately simplified or omitted.

Embodiment 1

FIG. 1 is a configuration diagram of an elevator system according to Embodiment 1 of the present invention.

FIG. 1 schematically shows an elevator system. In FIG. 1, a plurality of emergency detectors 1 are each provided on floors of a building. For example, the plurality of emergency detectors 1 are fire detectors (fire alarms). In the building, an evacuation floor in case of an emergency is set. For example, the evacuation floor is set to a first floor with an entrance connecting the inside and outside of the building.

A hoistway 2 of an elevator extends through the floors of the building. A plurality of halls 3 of the elevator are provided on the floors of the building so as to face the hoistway 2. A plurality of cars 4 of the elevator are provided in the hoistway 2. The plurality of cars 4 are provided so as not to overlap on a horizontal projection plane. The plurality of cars 4 are provided to be able to move up and down in the hoistway 2 by power of a traction machine (not shown).

On the plurality of halls 3, a plurality of hall doors 5 are provided correspondingly to the plurality of cars 4.

A plurality of car doors 6 are provided in the plurality of cars 4.

On each of the plurality of halls 3, one of the plurality of hall destination floor input devices 7 is provided on a wall surface between a leftmost hall door 5 and a middle hall door 5. The other of the plurality of hall destination floor input devices 7 is provided on a wall surface between a rightmost hall door 5 and the middle hall door 5. The plurality of hall destination floor input devices 7 each include an information input unit 7*a*, a signal transmission unit 7*b*, a signal receiving unit 7*c*, an announcing unit 7*d*, and a control unit 7*e*.

A plurality of ear operating panels 8 are provided in the plurality of cars 4. For example, the plurality of car operating panels 8 each include a door closing button 8*a* and a door opening button 8*b*.

For example, a control system 9 is provided in the building. For example, the control system 9 is provided above the hoistway 2. For example, the control system 9 includes a detection unit 9*a*, a signal receiving unit 9*b*, a signal transmission unit 9*c*, and a control unit 9*d*.

For example, a monitoring device 10 is provided in the building. For example, the monitoring device 10 is provided in a monitoring room in the building.

If an emergency does not occur on any floors in the building, the emergency detectors 1 on any floors do not detect an emergency. In this case, the monitoring device 10 does not detect an emergency. In this case, the monitoring device 10 does not transmit emergency information.

If the monitoring device 10 does not transmit emergency information, the detection unit 9*a* of the control system 9 does not receive emergency information from the monitoring device 10. In this case, an operation mode of the control system 9 is a normal mode. The normal mode here refers to a mode other than an emergency mode based on emergency information of the building.

In this case, if the information input unit 7*a* of any hall destination floor input device 7 receives input of information on a destination floor from a user of the elevator, the control unit 7*e* causes the signal transmission unit 7*b* to transmit a signal for a destination call corresponding to the destination floor. Specifically, the control unit 7*e* causes the signal transmission unit 7*b* to transmit a signal indicating a floor provided with the hall destination floor input device 7 and the destination floor.

The signal receiving unit 9*b* of the control system 9 receives the signal indicating the floor provided with the hall destination floor input device 7 and the destination floor from the hall destination floor input device 7. The control unit 9*d* determines a car 4 to be assigned to a hall call corresponding to the floor provided with the hall destination floor input device 7 and a car call corresponding to the destination floor. The control unit 9*d* causes the signal transmission unit 9*c* to transmit a signal indicating the car 4.

The signal receiving unit 7*c* of the hall destination floor input device 7 receives the signal indicating the car 4 from the control system 9. The control unit 7*e* causes the announcing unit 7*d* to announce information indicating the car 4.

The control unit 9*d* of the control system 9 causes the car 4 to respond to the hall call. As a result, the car 4 reaches the floor provided with the hall destination floor input device 7 to pick up the user. Then, the control unit 9*d* causes the car 4 to respond to the car call. As a result, the car 4 reaches the destination floor to discharge the user.

For example, if an emergency occurs on any floor, the emergency detector 1 on the floor detects the emergency. The monitoring device 10 detects the emergency based on a detection result of the emergency detector 1. In this case, the monitoring device 10 transmits emergency information to the control system 9.

Here, the case where the emergency detector 1 transmits the emergency information to the control system 9 via the monitoring device 10 has been described, but an emergency control operation may be performed using a manual switch. During the emergency control operation, the emergency information is transmitted directly from the emergency detector 1 to the control system 9.

The detection unit 9*a* of the control system 9 receives the emergency information from the monitoring device 10. In this case, the control system 9 switches the operation mode to the emergency mode.

In this case, the control unit 9*d* of the control system 9 causes the plurality of cars 4 to travel to the evacuation floor. Then, the control unit 9*d* opens the car door 6 of the car 4 and the hall door 5 corresponding to the car 4 for a preset time so as to urge a user in the car 4 having reached the evacuation floor to evacuate. Then, the control unit 9*d* causes the car 4 to stand by with the door closed. Specifically, the control unit 9*d* causes the car 4 to stand by on the evacuation floor with the car door 6 and the hall door 5 closed.

When the operation mode of the control system 9 is switched to the emergency mode, the control unit 9*d* causes the signal transmission unit 9*c* to transmit an emergency signal to the plurality of hall destination floor input devices 7 on the evacuation floor.

The signal receiving units 7*c* of the plurality of hall destination floor input devices 7 on the evacuation floor receive the emergency signal. The control unit 7*e* switches the operation mode of the hall destination floor input device 7 to the emergency mode. The control unit 7*e* causes the announcing unit 7*d* to announce information indicating that the elevator cannot be used. For example, the control unit 7*e* causes the announcing unit 7*d* to display textual information of "Out of Service".

In this state, when the information input unit 7*a* starts receiving input of information, the control unit 7*e* causes the signal transmission unit 7*b* to transmit a signal to open the door of the elevator on the hall 3. For example, when a firefighter having rushed to the evacuation floor starts input of information using the information input unit 7*a*, the control unit 7*e* causes the signal transmission unit 7*b* to transmit a signal to open the door of the elevator on the hall 3.

The signal receiving unit 9*b* of the control system 9 receives the signal to open the door of the elevator on the hall 3 from the hall destination floor input device 7. The control unit 9*d* opens the car door 6 of the car 4 and the hall door 5 corresponding to the car door 6 for a preset time, the car 4 standing by on the evacuation floor with the car door 6 and the hall door 5 closed. For example, in FIG. 1, the control unit 9*d* opens the car door 6 of the middle car 4 and the hall door 5 corresponding to the car door 6 for a preset time, the middle car 4 standing by on the evacuation floor with the car door 6 and the hall door 5 closed. If the plurality of cars 4 are standing by on the evacuation floor with their doors closed, the car doors 6 of the cars 4 and the hall doors 5 corresponding to the car doors 6 are opened for a preset time.

In this case, the firefighter checks that the user is not trapped in the car 4. Then, the control unit 9*d* closes the car door 6 and the hall door 5 and causes the car 4 to stand by on the evacuation floor.

On the other hand, the control unit 9*d* does not open the car door 6 of the car 4 having not reached the evacuation floor, and the hall door 5 corresponding to the car door 6.

If the door opening button 8*b* on the car operating panel 8 is pressed in the car 4 standing by on the evacuation floor with the ear door 6 and the hall door 5 corresponding to the car door 6 closed, the control unit 9*d* opens the car door 6 and the hall door 5 corresponding to the car door 6. Thus, even if the user is stranded in the car 4 on the evacuation floor, the user can escape from the car 4 by himself/herself.

Figure 2:
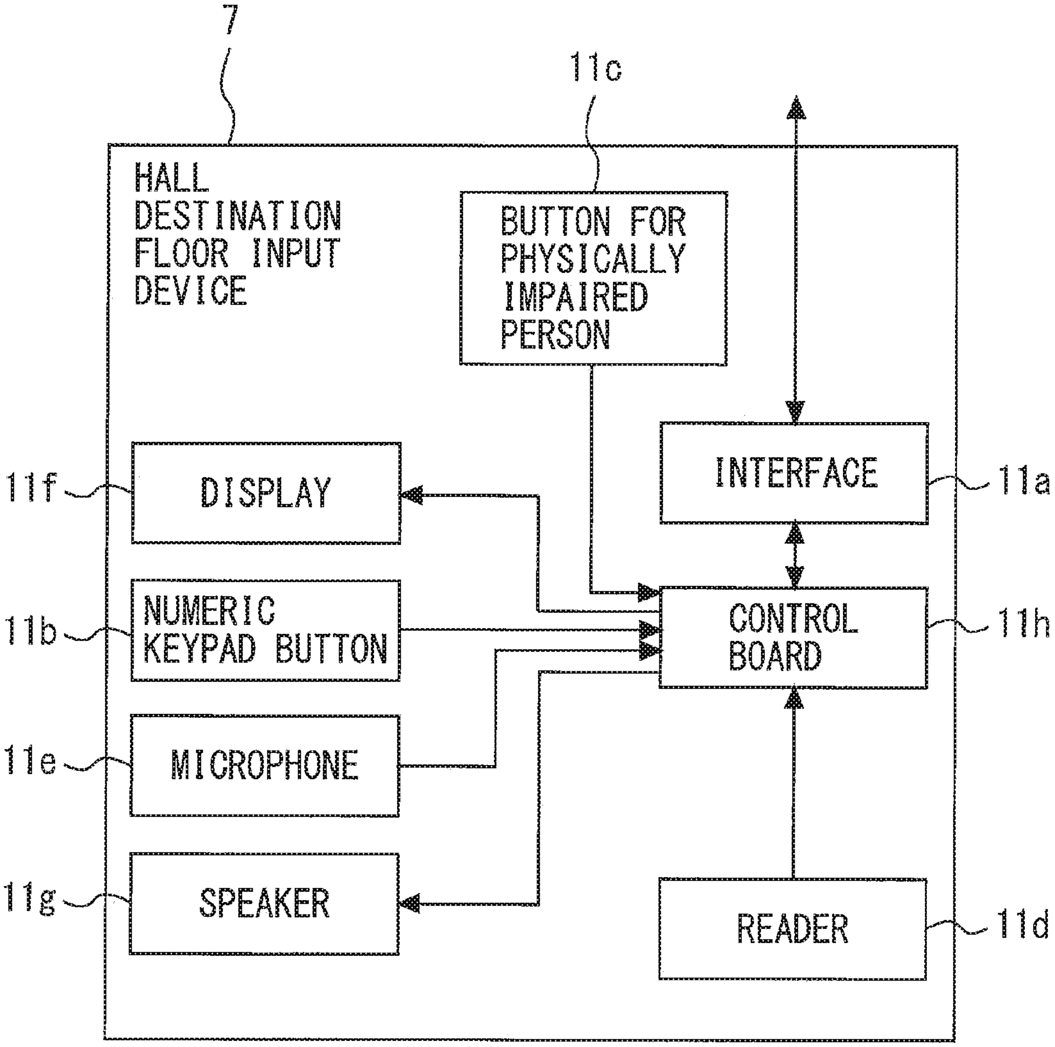
FIG. 2 is a configuration diagram of a hall destination floor input device in the elevator system according to Embodiment 1 of the present invention.

Next, with reference to FIG. 2, an example of the hall destination floor input device 7 on the evacuation floor will. be described.

FIG. 2 is a configuration diagram of the destination floor input device in the elevator system according to Embodiment 1 of the present invention.

As shown in FIG. 2, the hall destination floor input device 7 includes an interface 11*a*, a numeric keypad button 11*b*, a button for physically impaired person 11*c*, a reader 11*d*, a microphone 11*e*, a display 11*f*, a speaker 11*g*, and a control board 11*h*.

The interface 11*a* serves as the signal transmission unit 7*b* and the signal receiving unit 7*c* in FIG. 1. The interface 11*a* is provided to transmit a signal to a control system 12 and receive a signal from the control system 12.

The numeric keypad button 11*b* serves as the information input unit 7*a* in FIG. 1. The numeric keypad button 11*b* includes a plurality of buttons corresponding to numbers 0 to 9.

The button for physically impaired person 11*c* serves as the information input unit 7*a* in FIG. 1. The button for physically impaired person 11*c* is provided to be pressed by a user of the elevator, who is a physically impaired person.

The reader 11*d* serves as the information input unit 7*a* in FIG. 1. The reader 11*d* is provided to read identification information from a tag (not shown). For example, the reader 11*d* is an RFID reader.

The microphone 11*e* serves as the information input unit 7*a* in FIG. 1. The microphone 11*e* is provided to receive input of voice information.

The display 11*f* serves as the announcing unit 7*d* in FIG. 1. The display 11*f* is provided to display information on a destination floor or the like.

The speaker 11*g* serves as the announcing unit 7*d* in. FIG. 1, The speaker 11*g* is provided to output the information on a destination floor or the like by voice.

The control board 11*h* serves as the control unit 7*e* in FIG. 1. The control board 11*h* controls the overall operation of the hall destination floor input device 7. The control board 11*h* performs different controls according to the operation mode of the hall destination floor input device 7.

For example, if the operation mode of the hall destination floor input device 7 is the normal mode, the control board 11*h* determines whether or not any button is pressed again before a preset time elapses after any one button of the numeric keypad button 11*b* is pressed. If the preset time simply elapses without any button being pressed again after any one button of the numeric keypad button 11*b* is pressed, the control board 11*h* transmits, via the interface 11*a*, a signal indicating a destination floor corresponding to a one-digit number, which corresponds to the pressed button. If any button is pressed before the preset time elapses after any one button of the numeric keypad button 11*b* is pressed, the control board 11*h* transmits, via the interface 11*a*, a signal indicating destination floors corresponding to a two-digit number, which corresponds to the two pressed buttons. For example, when the operation mode of the hall destination floor input device 7 is the emergency mode, the control board 11*h* transmits, via the interface 11*a*, a signal to open the door of the elevator on the hall 3 immediately after any one button of the numeric keypad button 11*b* is pressed, without waiting for the elapse of the preset time.

For example, if the operation mode of the hall destination floor input device 7 is the normal mode, the control board 11*h* transmits, via the interface 11*a*, a signal indicating a destination floor for a physically impaired person when the numeric keypad button 11*b* is pressed after the button for physically impaired person 11*c* is pressed. For example, if the operation mode of the hall destination floor input device 7 is the emergency mode, the control board 11*h* transmits, via the interface 11*a*, a signal to open the door of the elevator on the hall 3 immediately after the button for physically impaired person 11*c* is pressed.

For example, if the operation mode of the hall destination floor input device 7 is the normal mode, the control board 11*h* transmits, via the interface 11*a*, a signal indicating a destination floor corresponding to identification information when the reader 11*d* reads the identification information from the tag. For example, if the operation mode of the hall destination floor input device 7 is the emergency mode, the control board 11*h* transmits, via the interface 11*a*, a signal to open the door of the elevator on the hall 3 immediately after the reader 11*d* reads identification information of the firefighter from the tag.

For example, if the operation mode of the hall destination floor input device 7 is the normal mode, the control board 11*h* transmits, via the interface 11*a*, a signal indicating a destination floor when the microphone 11*e* receives input of voice information on the destination floor. For example, if the operation mode of the hall destination floor input device 7 is the emergency mode, the control board 11*h* transmits, via the interface 11*a*, a signal to fully open the door of the elevator on the hall 3 immediately after the microphone 11*e* starts receiving the input of voice information.

Next, with reference o FIG. 3, the control system 9 will be described.

Figure 3:
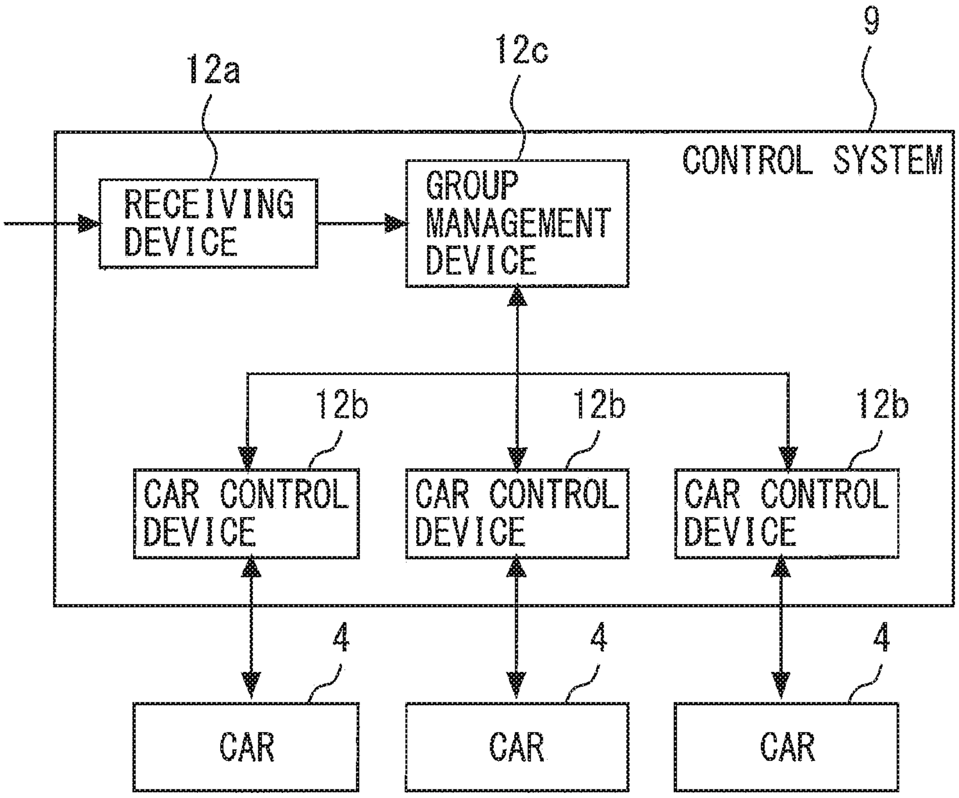
FIG. 3 is a configuration diagram of a control system in the elevator system according to Embodiment 1 of the present invention.

FIG. 3 is a configuration diagram of the control system in the elevator system according to Embodiment 1 of the present invention.

As shown in FIG. 3, the control system 9 includes a receiving device 12*a*, a plurality of ear control devices 12*b*, and a group management device 12*c*.

The receiving device 12*a* serves as the detection unit 9*a* in FIG. 1. The receiving device 12*a* is provided to receive emergency information from the monitoring device 10 (from the emergency detector 1 during the emergency control operation).

The plurality of car control devices 12*b* serve as part of the control unit 9*d* in FIG. 1. The plurality of car control devices 12*b* are provided to control the plurality of cars 4.

The group management device 12*c* serves as the signal receiving unit 9*b*, the signal transmission unit 9*c*, and part of the control unit 9*d* in FIG. 1. The group management device 12*c* is provided to receive a signal from the hall destination floor input device 7 via the car control devices 12*b*. The group management device 12*c* is also provided to transmit a signal to the hall destination floor input device 7. The group management device 12*c* is also provided to control the plurality of car control devices 12*b*.

Next, with reference to FIG. 4, an outline of an operation of the hall destination floor input device 7 will be described.

Figure 4:
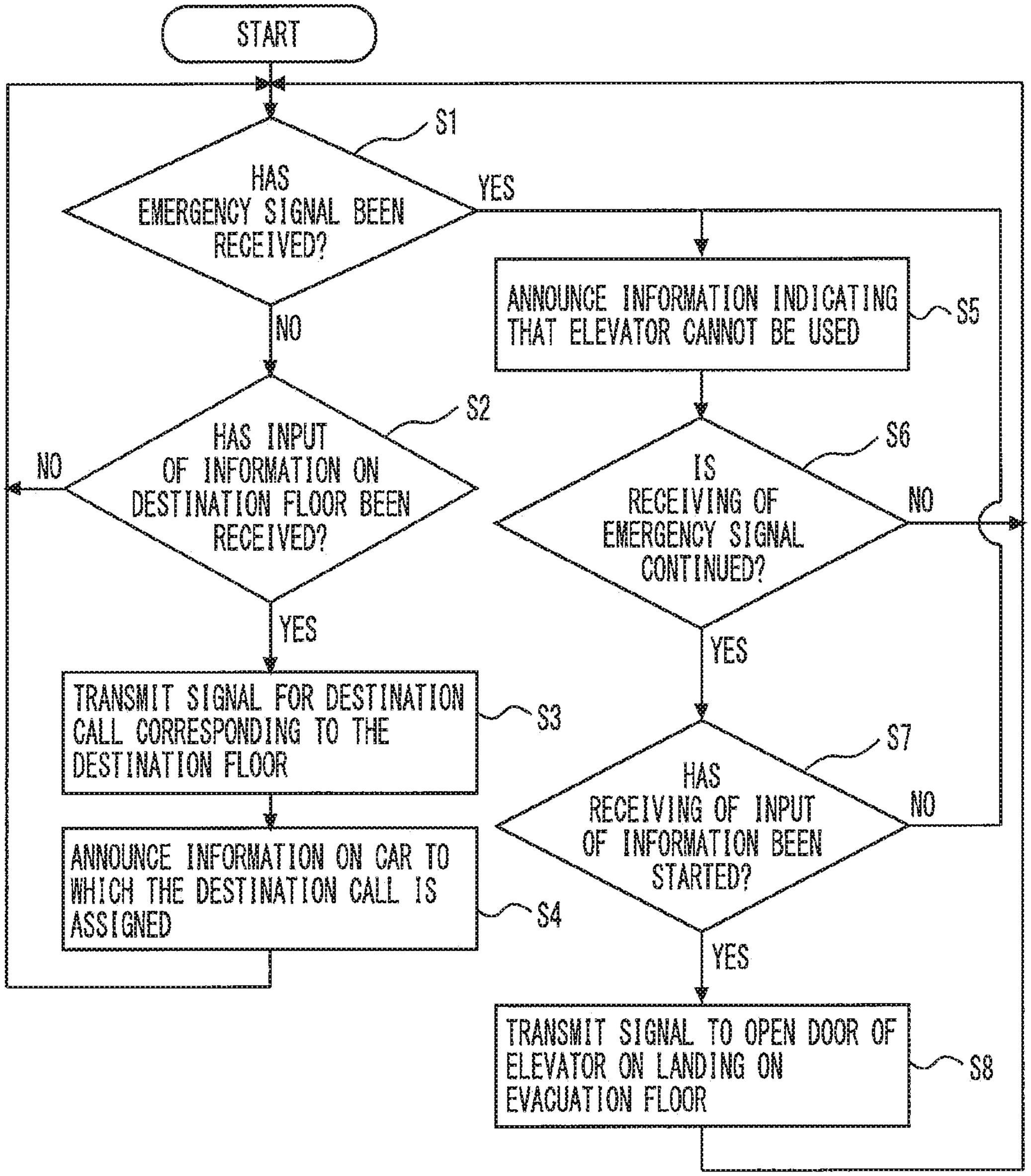
FIG. 4 is a flowchart of an outline of an operation of the hall destination floor input device in the elevator system according to Embodiment 1 of the present invention.

FIG. 4 is a flowchart of an outline of the operation of the hall destination floor input device in the elevator system according to Embodiment 1 of the present invention.

In Step S1, the hall destination floor input device 7 determines whether or not it has received an emergency signal.

If the hall destination floor input device 7 has not received the emergency signal in Step S1, the hall destination floor input device 7 performs an operation in Step S2.

In Step S2, the hall destination floor input device 7 determines whether has received input of information on a destination floor.

If the hall destination floor input device 7 has not received the input of information on a destination floor in Step S2, the hall destination floor input device 7 again performs the operation in Step S1. If the hall destination floor input device 7 has received the input of information on a destination floor in Step S2, the hall destination floor input device 7 performs an operation in Stop S3.

In Step S3, the hall destination floor input device 7 transmits a signal for a destination call corresponding to the destination floor.

Then, the hall destination floor input device 7 performs an operation in Step S4. In Step S4, the hall destination floor input device 7 announces information on the car 4 to which the destination call is assigned. Then, the hall destination floor input device 7 again performs the operation in Step S1.

If the hall destination floor input device 7 has received the emergency signal in Step S1, the hall destination floor input device 7 performs an operation in Step S5.

In Step S5, the hall destination floor input device 7 announces information indicating that the elevator cannot be used. Then, the hall destination floor input device 7 performs an operation in Step S6. In Step S6, the hall destination floor input device 7 determines whether or not it continues receiving the emergency signal.

If receiving of the emergency signal is not continued in Step S6, the hall destination floor input device 7 performs the operation in Step S1. If receiving of the emergency signal is continued in Step S6, the hall destination floor input device 7 performs an operation in Step S7. In Step S7, the hall destination floor input device 7 determines whether or not it has started receiving input of information.

If the hall destination floor input device 7 has not started receiving the input of information in Step S7, the hall destination floor input device 7 performs the operation in Step S5. If the hall destination floor input device 7 has started receiving the input of information in Step S7, the hall destination floor input device 7 performs an operation in Step S8.

In Step S8, the hall destination floor input device 7 transmits a signal to open the door of the elevator on the hall 3 on the evacuation floor to the control system 9. Then, the hall destination floor input device 7 again performs the operation in Step S1.

Next, with reference to FIG. 5, an outline of an operation of the control system 9 will be described.

Figure 5:
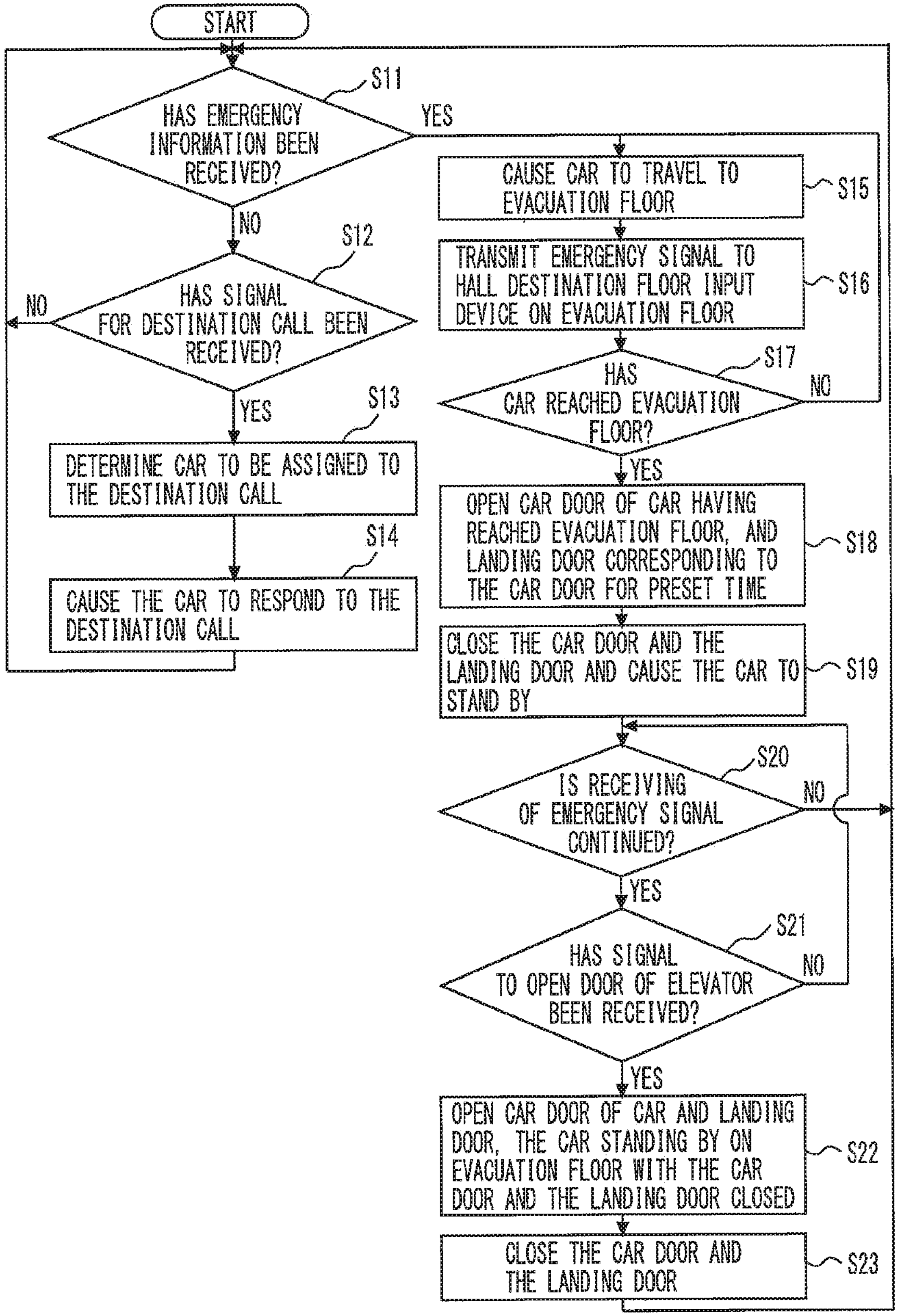
FIG. 5 is a flowchart of an outline of an operation of the control system in the elevator system according to Embodiment 1 of the present invention.

FIG. 5 is a flowchart of the outline of the operation of the control system in the elevator system according to Embodiment 1 of the present invention.

In Step S11, the control system 9 determines whether or not it has received emergency information.

If the control system 9 has not received the emergency information in Step S11, the control system 9 performs an operation in Step S12.

In Step S12, the control system 9 determines whether or not it has received a signal for a destination call.

If the control system 9 has not received the signal for a destination call in Step S12, the control system 9 again performs the operation in Step S11. If the control system 9 has received the signal for a destination call in Step S12, the control system 9 performs an operation in Step S13.

In Step S13, the control system 9 determines a car 4 to be assigned to the destination call. Then, the control system 9 performs an operation in Step S14. In Step S14, the control system 9 causes the car 4 to respond to the destination call. Then, the control system 9 again performs the operation in Step S11.

If the control system 9 has received the emergency information in Step S11, the control system 9 performs an operation in Step S15. In Step S15, the control system 9 causes the car 4 to travel to the evacuation floor. Then, the control system 9 performs an operation in Step S16.

In Step S16, the control system 9 transmits an emergency signal to the hall destination floor input device 7 on the evacuation floor. Then, the control system 9 performs an operation in Step S17.

In Step S17, the control system 9 determines whether or not the car 4 has reached the evacuation floor.

If the car 4 has not reached the evacuation floor in Step S17, the control system 9 performs the operation in Step S15. If the car 4 has reached the evacuation floor in Step S17, the control system 9 goes to Step S18.

In Step S18, the control system 9 opens the car door 6 of the ear 4 having reached the evacuation floor, and the hall door 5 corresponding to the car door 6 for a preset time. Then, the control system 9 performs an operation in Step S19.

In Step S19, the control system 9 closes the car door 6 and the hall door 5 and causes the car 4 to stand by. Then, the control system 9 performs an operation in Step S20. In Step S20, the control system 9 determines whether or not it continues receiving the emergency signal.

If receiving of the emergency signal is not continued in Step S20, the control system 9 performs the operation in Step S11. If receiving of the emergency signal is continued in Step S20, the control system 9 performs an operation in Step S21.

In Step S21, the control system 9 determines whether or not it has received a signal to open the door of the elevator.

If the control system 9 has not received the signal to open the door of the elevator in Step S21, the control system 9 performs the operation in Step S20. If the control system 9 has received the signal to open the door of the elevator in Step S21, the control system 9 performs an operation in Step S22.

In Step S22, the control system 9 opens the car door 6 of the car 4 and the hall door 5 for a preset time, the car 4 standing by on the evacuation floor with the car door 6 and the hall door 5 closed. Then, the control system 9 performs an operation in Step S23. In Step S23, the control system 9 closes the car door 6 and the hall door 5. Then, the control system 9 again performs the operation in Step S11.

According to Embodiment 1 described above, if the operation mode of the hall destination floor input device 7 is the emergency mode, the hall destination floor input device 7 provided on the evacuation floor transmits the signal to open the door of the elevator on the hall 3 on the evacuation floor when the hall destination floor input device 7 starts receiving the input of information. This allows an easy check of whether or not the user is trapped in the car 4 standing by on the evacuation floor with its door closed in case of an emergency.

For example, if the operation mode of the hall destination floor input device 7 is the emergency mode, the control board 11*h* immediately transmits, via the interface 11*a*, the signal to open the door of the elevator on the hall 3 before the preset time elapses after any one button of the numeric keypad button 11*b* is pressed. This allows an immediate cheek of whether or not the user is trapped in the car 4 standing by on the evacuation floor with its door closed in case of an emergency.

For example, if the operation mode of the hall destination floor input device 7 is the emergency mode, the control board 11*h* transmits, via the interface 11*a*, the signal to open the door of the elevator on the hall 3 immediately after the button for physically impaired person 11*c* is pressed. This allows an immediate check of whether or not the user is trapped in the car 4 standing by on the evacuation floor with its door closed in case of an emergency.

For example, if the operation mode of the hall destination floor input device 7 is the emergency mode, the control board 11*h* transmits, via the interface 11*a*, the signal to open the door of the elevator on the hall 3 immediately after the reader 11*d* reads the identification information of the fire-fighter from the tag. This allows an immediate check of whether or not the user is trapped in the car 4 standing by on the evacuation floor with its door closed in case of an emergency.

For example, if the operation ode of the hall destination floor input device 7 is the emergency mode, the control board 11*h* transmits, via the interface 11*a*, the signal to fully open the door of the elevator on the hall 3 immediately after the microphone 11*e* starts receiving the input of voice information. This allows an immediate check of whether or not the user is trapped in the car 4 standing by on the evacuation floor with its door closed in case of an emergency.

Specifically, if the hall destination floor input device 7 starts receiving the input of information to transmit the signal to fully open the door of the elevator, the control board 11*h* fully opens the car door 6 of the car 4 standing by on the evacuation floor with its door closed, and the hall door 5 corresponding to the car door 6. This allows a more reliable check of whether or not the user is trapped in the car 4 standing by on the evacuation floor with its door closed in case of an emergency.

Also, if the hall destination floor input device 7 receives the input of information to transmit information to open the door of the elevator on the hall 3, the car door 6 of the car 4 standing by on the evacuation floor with its door closed, and the hall door 5 corresponding to the car door 6 may be operated to be opened. If the hall destination floor input device 7 stops receiving the input of information to stop transmitting the signal to open the door of the elevator on the hall 3, the car door 6 of the car 4 standing by on the evacuation floor with its door closed, and the hall door 5 corresponding to the car door 6 may be operated to be closed. In this case, the car 4 can be caused to stand by with its door closed immediately after whether or not the user is trapped in the car 4 standing by on the evacuation floor with its door closed is checked in case of an emergency.

The case with the plurality of cars 4 moving through the plurality of hoistways 2 has been described so far. However, the control system 9 according to Embodiment 1 may be applied to an elevator including only one hoistway 2 and one car 4. In this case, the car control device 12*b* may serve as the detection unit 9*a*, the signal receiving unit 9*b*, the signal transmission unit 9*c*, and the control unit 9*d*. Also in this case, whether or not the user is trapped in the car 4 standing by on the evacuation floor with its door closed can be easily checked in case of an emergency.

Next, with reference to FIG. 6, an example of the control board 11*h* will be described.

Figure 6:
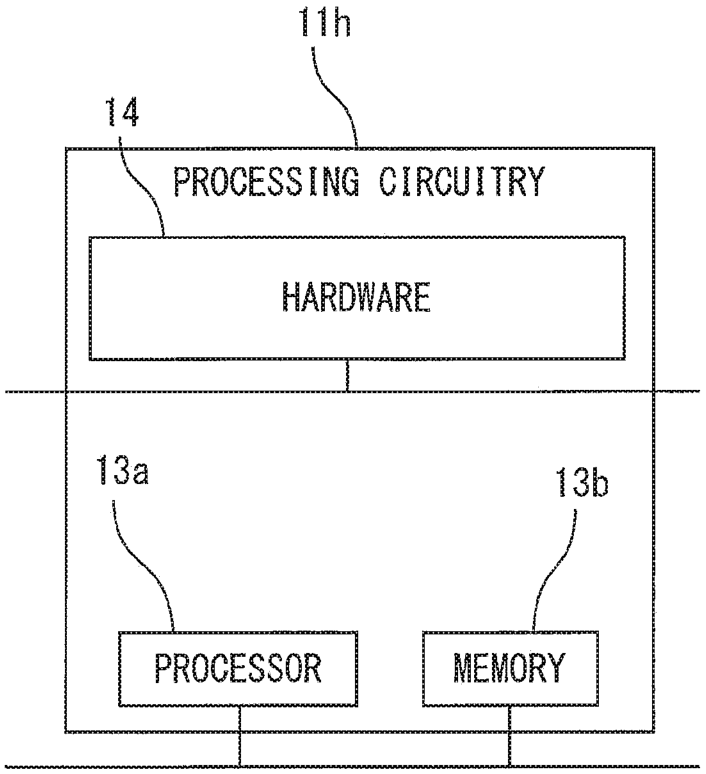
FIG. 6 is a configuration diagram of hardware of the hall destination floor input device in the elevator system according to Embodiment 1 of the present invention.

FIG. 6 is a configuration diagram of hardware of the control board of the hall destination floor input device in the elevator system according to Embodiment 1 of the present invention.

Functions of the control board 11*h* can be achieved by a processing circuitry. For example, the processing circuitry includes at least one processor 13*a* and at least one memory 13*b*. For example, the processing circuitry includes at least one dedicated hardware 14.

When the processing circuitry includes the at least one processor 13*a* and the at least one memory 13*b*, the functions of the control board 11*h* are achieved by software, firmware, or a combination of the software and the firmware. At least one of the software and the firmware is described as a program. At least one of the software and the firmware is stored in the at least one memory 13*b*. The at least one processor 13*a* reads and executes the program stored in the at least one memory 13*b* to achieve the functions of the control board 11*h*. The at least one processor 13*a* is also referred to as a central processing unit (CPU), a central processing device, a processing device, a computing device, a microprocessor, a microcomputer, or a DSP. For example, the at least one memory 13*b* is a non-volatile or volatile semiconductor memory such as a RAM, a ROM, a flash memory, an EPROM, or an EEPROM, a magnetic disk, a flexible disk, an optical disk, a compact disk, a mini disk, a DVD, or the like.

When the processing circuitry includes the at least one dedicated hardware 14, the processing circuitry is achieved by, for example, a single circuit, a complex circuit, a programmed processor, a parallel-programmed processor, an ASIC, a FPGA, or combinations thereof. For example, the functions of the control board 11*h* are each achieved by the processing circuitry. For example, the functions of the control board 11*h* are collectively achieved by the processing circuitry.

One part of the functions of the control board 11*h* may be achieved by the dedicated hardware 14, while the other part may be achieved by the software or the firmware. For example, the function of controlling display on the display 11*f* may be achieved by the processing circuitry as the dedicated hardware 14, while the functions other than the function of controlling display on the display 11*f* may be achieved by the at least one processor 13*a* reading and executing the program stored in the at least one memory 13*b*.

In this manner, the processing circuitry achieves the functions of the control board 11*h* with the hardware 14, the software, the firmware, or combinations thereof.

Functions of the car control device 12*b* are also achieved by a processing circuitry similar to that of the control board 11*h*, although not shown. Functions of the group management device 12*c* are also achieved by a processing circuitry similar to that of the control board 11*h*.

The functions of the group management device 12*c* and the plurality of car control devices 12*b* may be collectively achieved by the same processing circuitry.

INDUSTRIAL APPLICABILITY

As described above, the hall destination floor input device for elevators, the elevator control system, and the elevator system according to the present invention can be used for a system that allows an easy check of whether or not a user is trapped in a car standing by on an evacuation floor with its door closed in ease of an emergency.

REFERENCE SIGNS LIST

1 emergency detector
2 hoistway
3 hall
4 car
5 hall door
6 car door
7 hall destination floor input device
7*a* information input unit
7*b* signal transmission unit
7*c* signal receiving unit
7*d* announcing unit
7*e* control unit
8 car operating panel
8*a* door closing button
8*b* door opening button
9 control system
9*a* detection unit
9*b* signal receiving unit
9*c* signal transmission unit
9*d* control unit
10 monitoring device
11*a* interface
11*b* numeric keypad button
11*c* button for physically impaired person
11*d* reader
11*e* microphone
11*f* display
11*g* speaker
11*h* control board
12*a* receiving device
12*b* car control device
12*c* group management device
13*a* processor
13*b* memory
14 hardware

The invention claimed is:

1. A hall destination floor input device for elevators comprising:

an information input receiver provided on a hall of an elevator on a floor set as an evacuation floor in case of an emergency in a building including the elevator, the information input receiver being configured to receive input of information;

a signal transmitter configured to transmit a signal to a control system of the elevator; and a controller configured to cause the signal transmitter to transmit a signal indicating a destination floor of the elevator when the information input receiver receives input of information on the destination floor if an operation mode is not an emergency mode based on emergency information of the building, and cause the signal transmitter to transmit a signal to open a door of the elevator on the hall when the information input receiver starts receiving input of information if the operation mode is the emergency mode, wherein the information input receiver includes a numeric keypad button corresponding to numbers, and the controller causes the signal transmitter to transmit a signal indicating a destination floor corresponding to a one-digit number, which corresponds to a button pressed when a preset time elapses without any button being pressed again after any one button of the numeric keypad button is pressed if the operation mode is not the emergency mode, and causes the signal transmitter to transmit the signal to open the door of the elevator on the hall before the preset time elapses after any one button of the numeric keypad button is pressed if the operation mode is the emergency mode.

2. The hall destination floor input device for elevators according to claim 1, wherein the information input receiver includes a button for physically impaired person configured to be pressed by a user of the elevator, who is a physically impaired person, and the controller causes the signal transmitter to transmit a signal indicating a destination floor for the physically impaired person when the numeric keypad button is pressed after the button for physically impaired person is pressed if the operation mode is not the emergency mode, and causes the signal transmitter to transmit the signal to open the door of the elevator on the hall when the button for physically impaired person is pressed if the operation mode is the emergency mode.

3. The hall destination floor input device for elevators according to claim 1, wherein the information input receiver includes a reader configured to read identification information from a tag, and the controller causes the signal transmitter to transmit a signal indicating a destination floor corresponding to the identification information when the reader reads the identification information from the tag if the operation mode is not the emergency mode, and causes the signal transmitter to transmit the signal to open the door of the elevator on the hall when the reader reads identification information of a firefighter from the tag if the operation mode is the emergency mode.

4. The hall destination floor input device for elevators according to claim 1, wherein the controller causes the signal transmitter to transmit a signal to fully open the door of the elevator on the hall when the information input receiver starts receiving input of information if the operation mode is the emergency mode.

5. A hall destination floor input device for elevators comprising:

an information input receiver provided on a hall of an elevator on a floor set as an evacuation floor in case of an emergency in a building including the elevator, the information input receiver being configured to receive input of information;

a signal transmitter configured to transmit a signal to a control system of the elevator; and a controller configured to cause the signal transmitter to transmit a signal indicating a destination floor of the elevator when the information input receiver receives input of information on the destination floor if an operation mode is not an emergency mode based on emergency information of the building, and cause the signal transmitter to transmit a signal to open a door of the elevator on the hall when the information input receiver starts receiving input of information if the operation mode is the emergency mode, wherein the controller causes the signal transmitter to transmit information to open the door of the elevator on the hall while the information input receiver is receiving input of information, and causes the signal transmitter to stop transmitting the information to open the door of the elevator on the hall when the information input receiver stops receiving the input of information, if the operation mode is the emergency mode.

6. An elevator control system comprising:

a controller including processing circuitry configured to open a door of an elevator on a hall of the elevator when a car of the elevator is standing by on the hall with the door closed, in a case where a hall destination floor input device starts receiving input of information to transmit a signal to open the door of the elevator on the hall, if an operation mode of the hall destination floor input device is an emergency mode based on emergency information of a building, the hall destination floor input device being provided on the hall of the elevator on a floor set as an evacuation floor in case of an emergency in the building including the elevator;

the processing circuitry of the controller is further configured to operate the door of the elevator to be opened if the hall destination floor input device receives the input of information to transmit information to open the door of the elevator on the hall; and the processing circuitry of the controller is further configured to operate the door of the elevator to be closed if the hall destination floor input device stops receiving the input of information to stop transmission of the signal to open the door of the elevator on the hall.

* * * * *